(12) United States Patent
Lail et al.

(10) Patent No.: US 6,618,527 B2
(45) Date of Patent: Sep. 9, 2003

(54) FIBER OPTIC CABLES HAVING GREASE LAYERS WITH REDUCED AGGLOMERATE SIZES

(75) Inventors: Jason C. Lail, Hickory, NC (US); Catharina L. Tedder, Conover, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/771,438

(22) Filed: Jan. 26, 2001

(65) Prior Publication Data

US 2002/0102079 A1 Aug. 1, 2002

(51) Int. Cl.$^7$ ................................................. G02B 6/44
(52) U.S. Cl. ........................ 385/114; 385/106; 385/112
(58) Field of Search ................................... 385/100–115

(56) References Cited

U.S. PATENT DOCUMENTS

| | | | |
|---|---|---|---|
| 4,176,910 A | 12/1979 | Noethe | 350/96.23 |
| 4,757,100 A * | 7/1988 | Wichelhaus et al. | 523/173 |
| 4,810,395 A | 3/1989 | Levy et al. | 252/28 |
| 4,839,970 A * | 6/1989 | Goetze et al. | 106/15.05 |
| 4,900,126 A | 2/1990 | Jackson et al. | 350/46.23 |
| 5,348,586 A | 9/1994 | Temple, Jr. et al. | 118/405 |
| 5,672,640 A | 9/1997 | Brauer | 523/173 |
| 5,698,615 A | 12/1997 | Polle | 523/173 |

* cited by examiner

Primary Examiner—Ellen E. Kim
(74) Attorney, Agent, or Firm—Timothy J. Aberle

(57) ABSTRACT

A fiber optic cable includes a buffer tube, a plurality of ribbons of optical fibers extending through the buffer tube and a grease layer disposed between at least one pair of adjacent ribbons. The grease layer includes a base component and a plurality of agglomerates formed filler particles, such as silica particles. The major dimension of the majority of the agglomerates is advantageously less than 100 microns in order to reduce microbending of the optical fibers and the resulting attenuation of the signals propagating along the optical fibers. The fiber optic cable can also include a filling compound that is disposed within the buffer tube and surrounds the optical fibers and that is also formed of a base component and a plurality of agglomerates, the majority of which similarly have a major dimension of less than 100 microns.

16 Claims, 3 Drawing Sheets

|    | F0    | F1    | F2    | F3    | F4    | F5    | F6    | F7    | F8    | F9    | F10   | F11   |
|----|-------|-------|-------|-------|-------|-------|-------|-------|-------|-------|-------|-------|
| R8 | 0.025 | 0.017 | 0.022 | 0.012 | 0.011 | 0.004 | 0.010 | 0.014 | 0.012 | 0.021 | 0.004 | 0.013 |
| R9 | 0.033 | 0.022 | 0.015 | 0.016 | 0.021 | 0.014 | 0.020 | 0.004 | 0.014 | 0.017 | 0.016 | 0.011 |
| R10| 0.026 | 0.016 | 0.023 | 0.013 | 0.008 | 0.010 | 0.006 | 0.009 | 0.006 | 0.009 | 0.014 | 0.015 |
| R11| 0.019 | 0.010 | 0.013 | 0.020 | 0.014 | 0.008 | 0.007 | 0.009 | 0.009 | 0.017 | 0.013 | 0.028 |

Fig. 7 (Prior Art)

|    | F0    | F1    | F2    | F3    | F4    | F5    | F6    | F7    | F8    | F9    | F10   | F11   |
|----|-------|-------|-------|-------|-------|-------|-------|-------|-------|-------|-------|-------|
| R8 | 0.019 | 0.020 | 0.017 | 0.009 | 0.008 | 0.003 | 0.007 | 0.009 | 0.004 | 0.016 | 0.011 | 0.013 |
| R9 | 0.012 | 0.017 | 0.018 | 0.019 | 0.010 | 0.007 | 0.009 | 0.008 | 0.012 | 0.020 | 0.018 | 0.013 |
| R10| 0.019 | 0.014 | 0.011 | 0.010 | 0.006 | 0.009 | 0.006 | 0.008 | 0.005 | 0.006 | 0.016 | 0.017 |
| R11| 0.015 | 0.010 | 0.011 | 0.014 | 0.008 | 0.005 | 0.007 | 0.007 | 0.010 | 0.014 | 0.014 | 0.020 |

Fig. 4a

|    | F0    | F1    | F2    | F3    | F4    | F5    | F6    | F7    | F8    | F9    | F10   | F11   |
|----|-------|-------|-------|-------|-------|-------|-------|-------|-------|-------|-------|-------|
| R8 | 0.008 | 0.007 | 0.010 | 0.006 | 0.003 | 0.006 | 0.005 | 0.008 | 0.007 | 0.009 | 0.005 | 0.004 |
| R9 | 0.012 | 0.011 | 0.012 | 0.011 | 0.007 | 0.006 | 0.006 | 0.008 | 0.009 | 0.011 | 0.015 | 0.001 |
| R10| 0.003 | 0.006 | 0.011 | 0.002 | 0.001 | 0.008 | 0.004 | 0.006 | 0.002 | 0.001 | 0.008 | 0.012 |
| R11| 0.005 | 0.006 | 0.007 | 0.010 | 0.004 | 0.004 | 0.004 | 0.005 | 0.011 | 0.013 | 0.004 | 0.005 |

Fig. 4b

FIBER OPTIC CABLES HAVING GREASE LAYERS WITH REDUCED AGGLOMERATE SIZES

FIELD OF THE INVENTION

The present invention relates generally to fiber optic cables and, more particularly, to fiber optic cables having a filling compound and/or grease layers that have agglomerates of filler particles having significantly reduced major dimensions.

BACKGROUND OF THE INVENTION

One common type of fiber optic cable includes one or more buffer tubes with a plurality of optical fibers disposed in each of the buffer tubes. For example, a fiber optic cable having a central buffer tube design includes a single buffer tube and a plurality of optical fibers extending lengthwise through the buffer tube. Alternatively, the fiber optic cable can include a plurality of buffer tubes, typically stranded about a central strength member. In either instance, each buffer tube may be filled with a filling compound. The filling compound primarily serves to prevent water ingress into and water propagation through the buffer tube. Moreover, the filling compound helps to maintain the optical fibers in a state of relatively low stress.

Conventional filling compounds are a grease comprised of a base component and a filler or thickener that adjusts the viscosity of the grease to an appropriate level. The base component can be formed of a variety of oils including hydrocarbon-based oils and polyalphaolefin-based oils or a polyglycol based oil. The filler is typically formed of a plurality of particles of silica, clay or the like and generally comprises no more than about 6% by weight of the filling compound. Additionally, the filling compound can include a polymer or rubber component in order to further thicken the grease, and a bridging agent to increase the yield strength of the grease without correspondingly increasing the viscosity of the grease.

In a typical ribbon cable, a plurality of ribbons of optical fibers extend lengthwise through the buffer tube. Typically, the ribbons are stacked and a helical twist is imparted to the lengthwise extending ribbon stack. In a ribbon cable, the filling compound not only fills the space within the buffer tube that surrounds the ribbon stack, but grease layers may be applied between each pair of adjacent ribbons of optical fibers. Among other things, the grease layers are intended to facilitate slight movement between adjacent ribbons of optical fibers as forces are applied to the ribbons. Typically, the grease layers are formed of the same material as the filling compound and therefore generally include a base component, such as an oil, and a filler that is typically formed of particles of silica, clay or the like.

The filler particles generally form agglomerates, each of which is formed of a plurality of particles. In a typical filling compound such as a Dussek Campbell 5264 filling compound, for example, the filler is formed of a plurality of agglomerates of silica particles. The size of the agglomerates varies, but the majority of the agglomerates have cross-sectional sizes above 100 microns, with some agglomerates having cross-sectional sizes that exceed 300 microns. By way of comparison, a typical optical fiber has a cross-sectional diameter of about 250 microns. Thus, some agglomerates may actually be larger than the optical fiber.

The agglomerates can cause difficulties, both during the fabrication of the fiber optic cable and during the operational life of the fiber optic cable. In some instances, the agglomerates may become lodged in equipment and obstruct the application of the grease. The fabrication process must then be temporarily halted and the equipment must be serviced in order to clear the agglomerates from the port. Additionally, the agglomerates can cause performance issues, e.g., microbending of the optical fibers which, in turn, can cause attenuation of the optical signals transmitted by the optical fibers. In this regard, the optical fibers that are at or near the corners of the ribbon stack are particularly susceptible to microbending as a result of the helical twist of the ribbon stack. The optical signals transmitted by the optical fibers that are at or near the corners of the ribbon stack may accordingly be disadvantageously attenuated.

It is oftentimes desirable to increase the fiber packing density of a fiber optic cable, such as a ribbon cable. As such, fiber optic cables have been designed in which the grease layers between the pairs of adjacent ribbons of optical fibers are reduced in thickness. For example, conventional fiber optic cables may include grease layers between the pairs of adjacent ribbons that have a thickness of between about 60 microns and 200 microns. Since the agglomerates that are larger than the grease layer are capable of causing microbending, fiber optic cables having thinner grease layers may experience increased microbending and correspondingly increased attenuation.

SUMMARY OF THE INVENTION

In view of the foregoing, a fiber optic cable according to one aspect of the present invention includes a buffer tube defining a lengthwise extending passageway; a plurality of ribbons of optical fibers extending through the passageway defined by the buffer tube; and a grease layer disposed between at least one pair of adjacent ribbons of optical fibers, wherein the grease layer includes a base component and a plurality of agglomerates formed of silica particles with the majority of the agglomerates having a major dimension of less than about 100 microns. In one embodiment, the fiber optic cable of this aspect of the present invention further includes a filling compound that at least partially fills the passageway defined by the buffer tube and that also includes a base component and a plurality of agglomerates comprised of silica particles.

A fiber optic cable according to another aspect of the present invention includes a buffer tube defining a lengthwise extending passageway; a plurality of ribbons of optical fibers extending through the passageway defined by the buffer tube; and a grease layer disposed between at least one pair of adjacent ribbons of optical fibers that has a thickness of no more than 50 microns and that includes a base component and a filler formed of a plurality of agglomerates, the majority of which have a major dimension of less than about 100 microns. In one exemplary embodiment, each agglomerate is comprised of a plurality of particles of either silica or clay.

According to yet another aspect of the present invention, a fiber optic cable includes a buffer tube defining a lengthwise extending passageway; a plurality of optical fibers extending through the passageway defined by the buffer tube; and a filling compound that is disposed within the buffer tube and surrounds the plurality of optical fibers and that includes a base component and plurality of agglomerates formed of silica particles, wherein a majority of the agglomerates have a major dimension of less than about 100 microns. In one embodiment, the fiber optic cable of this aspect of the present invention also includes a plurality of grease layers disposed between adjacent ribbons of optical fibers. Each grease layer of this embodiment of the fiber optic cable also includes a base component and a plurality of agglomerates with the majority of the agglomerates having a major dimension that is less than 100 microns. For example, the filling compound and the plurality of grease layers of this embodiment may be formed of the same compound.

BRIEF DESCRIPTION OF THE DRAWINGS

FIG. 3 is a graphical representation of the increase in attenuation per unit length of optical fiber, i.e., the delta attenuation, for signals propagating along each optical fiber of a ribbon stack of a conventional fiber optic cable using the conventional grease composition.

FIGS. 4a and 4b are graphical representations of the delta attenuation for signals propagating along each optical fiber of the ribbon stacks of two embodiments of the fiber optic cables employing the grease composition according to the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
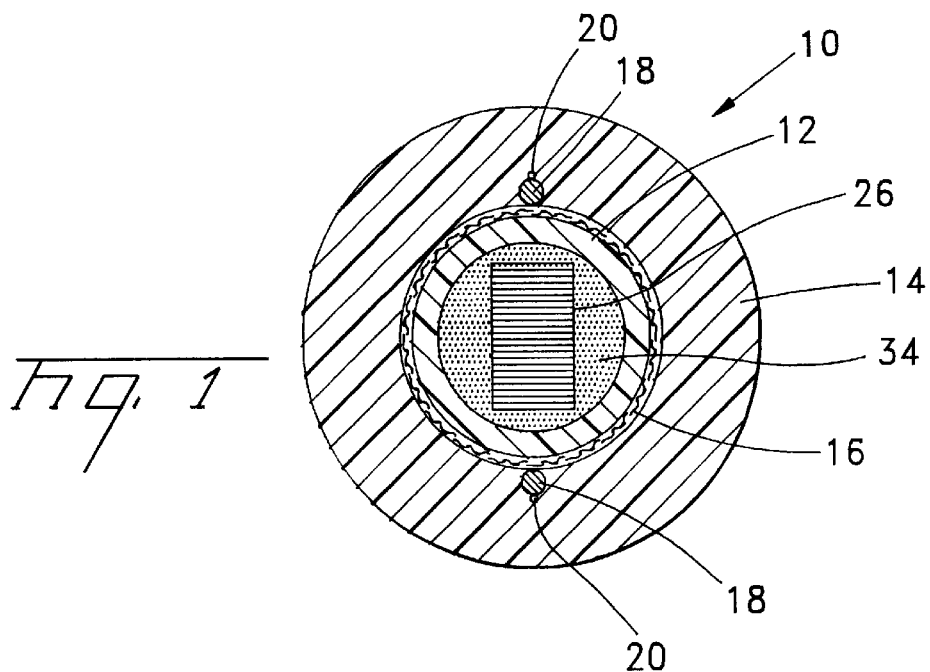
FIG. 1 is a cross-sectional view of a fiber optic cable according to one advantageous embodiment of the present invention.

Referring now to FIG. 1, a fiber optic cable 10 according to one advantageous embodiment to the present invention is illustrated. Fiber optic cable 10 includes a buffer tube 12 that defines a lengthwise extending passageway. While fiber optic cable 10 is illustrated and described herein as being of a central buffer tube design so as to have only a single buffer tube, fiber optic cable 10 can include two or more buffer tubes so as to have a multi-tube construction, if so desired. Buffer tube 12 is typically formed of a plastic such as polypropylene, although buffer tube 12 can be formed of other materials.

Fiber optic cable 10 also includes a jacket 14 that surrounds buffer tube 12. Typically, jacket 14 is also formed of a plastic such as a polyolefin and, more particularly, a high or medium density polyethylene. Jacket 14 can be formed of other materials, however, if so desired. In the illustrated embodiment, fiber optic cable 10 also includes a water blocking tape 16 that surrounds buffer tube 12. For example, water blocking tape 16 can be longitudinally wrapped about buffer tube 12 so as to define a longitudinally extending seam. While water blocking tape 16 can be formed of various materials, water blocking tape 16 of one embodiment is a non-woven tape impregnated with superabsorbent polymers. Fiber optic cable 10 can also include at least one strength member 18 extending lengthwise along buffer tube 12. While fiber optic cable 10 can have a single lengthwise extending strength member, fiber optic cable 10 typically includes a pair of diametrically opposed strength members that extend longitudinally along opposite sides of the buffer tube. Each strength member 18 can be formed of various materials including steel or other metals, a glass reinforced plastic (GRP) or an aramid reinforced plastic (ARP). Further, fiber optic cable 10 can include one or more rip cords 20 that extend lengthwise along strength members 18. By pulling rip cords 20 in both a radially outward and a longitudinal direction, rip cords 20 can sever or otherwise separate jacket 14 in order to expose strength members 18 and buffer tube 12. The exemplary embodiment of fiber optic cable 10 preferably includes water blocking tape 16, a pair of strength members 18 and a pair of rip cords 20. Fiber optic cable 10 can include other conventional cable components, such as an armor jacket, depending upon the application for which fiber optic cable 10 is designed.

Figure 2:
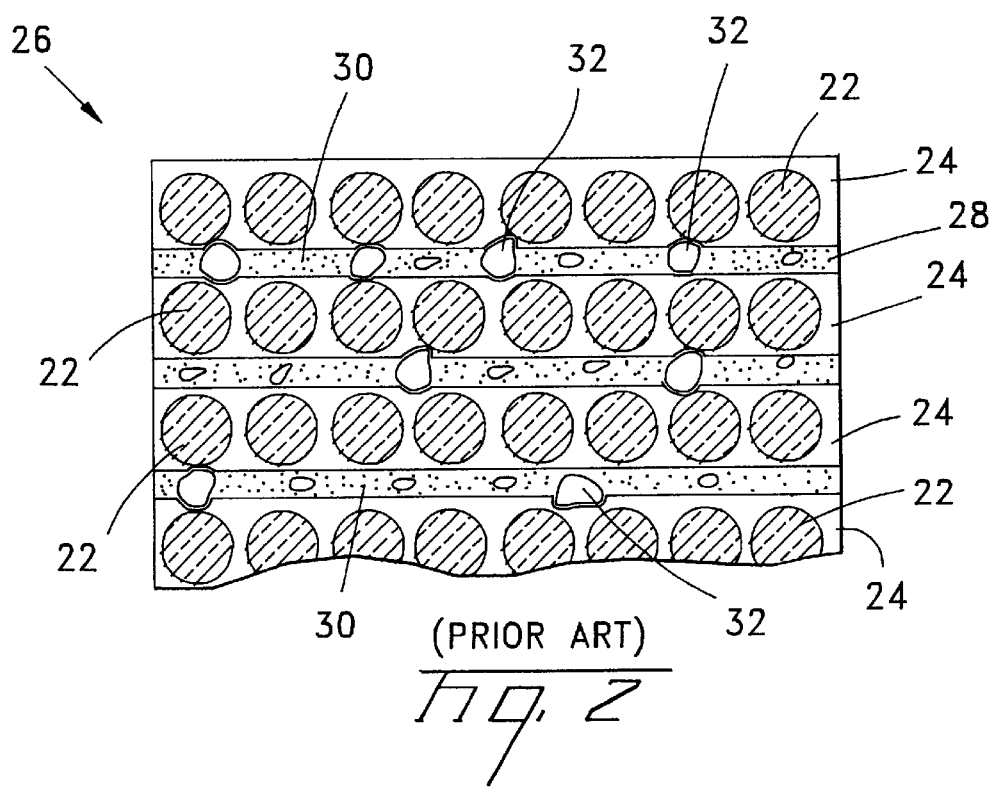
FIG. 2 is an enlarged partial fragmentary, cross-sectional view of a stack of ribbons of optical fibers with the conventional grease composition between the ribbons.

Fiber optic cable 10 further includes a plurality of optical fibers 22 extending lengthwise through the passageway defined by buffer tube 12. Optical fibers 22 can be disposed within the passageway in various manners, including loosely or in bundles. In at least some embodiments of the present invention, however, optical fibers 22 are disposed in ribbonized form as depicted in FIGS. 1 and 2 in which optical fibers 22 are encased by a conventional matrix material, for example, a UV curable material. While ribbons 24 depicted in FIG. 2 are shown to include eight optical fibers, ribbons 24 can include any number of optical fibers depending upon the application. The plurality of ribbons 24 are preferably arranged in a stacked configuration with one ribbon disposed adjacent another. Regardless of the configuration of optical fibers 22, however, a typical optical fiber includes a silica-based core that is operative to transmit light and is surrounded by a silica-based cladding having a lower index of refraction than the core. A soft primary coating surrounds the cladding, and a relatively rigid secondary coating surrounds the primary coating. Optical fibers can be, for example, single-mode or multimode optical fibers made commercially available by Coming, Inc.

In the embodiment of fiber optic cable 10 that includes a stack 26 of ribbons 24 of optical fibers 22, fiber optic cable 10 further includes a conventional grease layer 28 having a thickness of about 10 to 200 microns disposed between at least one pair and, more preferably, each pair of adjacent ribbons of optical fibers, as shown in FIG. 2. Grease layers 28 facilitate relative movement between adjacent ribbons of optical fibers. Each grease layer includes a base component 30 and a filler or thickener. Base component 30 can be formed of a variety of oils including hydrocarbon-based oils and polyalphaolefin-based oils, or a polyglycol. The filler preferably forms no more than about six percent by weight of grease layers 28 and is typically formed of particles that are, in preferred embodiment, silica, clay or the like. Although not necessary for the practice of the present invention, grease layers 28 can also include a bridging agent, such as polyglycol, to increase the yield strength of grease layer 28 without increasing the viscosity of grease layer 28. In addition, grease layers 28 can further include a polymer or rubber component, such as a Krayton™ thermoplastic elastomer, commercially available from Shell Oil Company, to further thicken grease layers 28.

Figure 5:
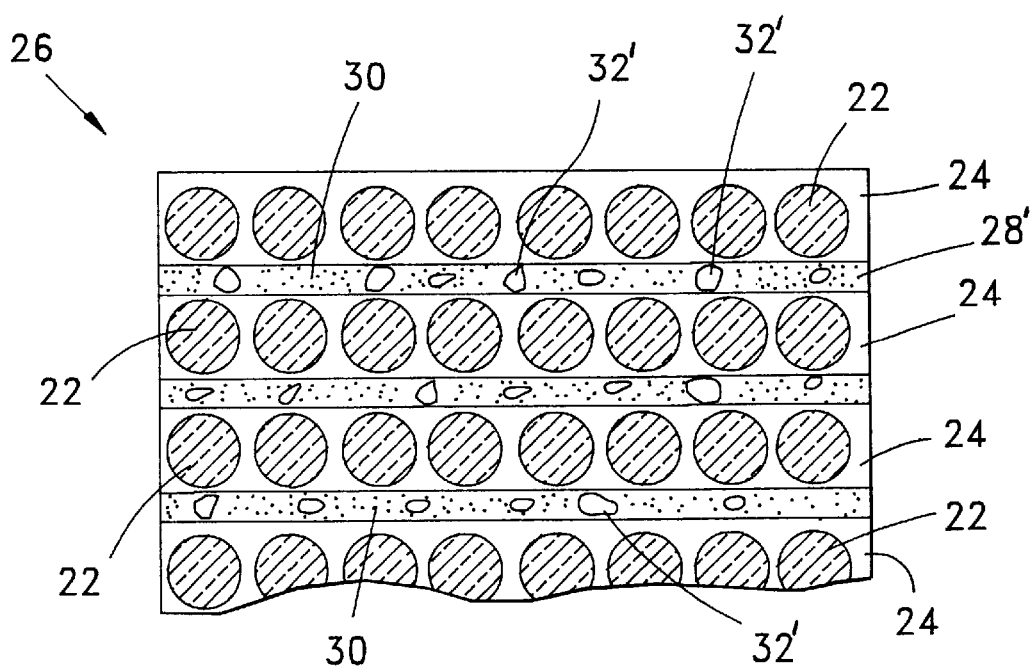
FIG. 5 is a schematic view of a ribbon stack employing the grease composition according to the present invention.

It has been discovered by the present inventors that the particles of the filler forming agglomerates 32 (FIG. 2) create a problem in that the agglomerates can undesirably push on the surfaces of the optical fiber ribbons, causing microbending. According to the discovery of the solution to the problem in accordance with the present invention, however, the conventional size of agglomerates 32 is significantly reduced to define agglomerates 32' (FIG. 5). In this regard, the size of agglomerates 32' is controlled by mixing the grease as to achieve the desired size distribution before applying grease layers 28 by means of a prewet die.

According to the present invention, a majority of agglomerates 32' of grease layers 28' have a major dimension of less than 150 microns and, more preferably, less than 100 microns. Moreover, the plurality of agglomerates 32' preferably have an average major dimension of less than about 150 microns and, more typically, between 75 microns and 125 microns. In other words, about 90%±10% of the agglomerates 32' are have major cross sectional dimension less than the thickness of the grease layer between adjacent optical ribbons. Preferably, about 80%±20%, more preferably 90±10%, or most preferably 95%±5% of agglomerates 32' have major cross sectional dimensions below about 100 microns, with about 50%±10% of agglomerates 32' having major cross sectional dimensions less than about 75 microns. While the size of agglomerates 32 can be determined in various manners, an agglomerate measurement device can be fabricated using a Fineness of Grind Gauge, commonly used for paints and varnishes, that employs Hegman's scale generally according to ISO 1524. The measurement device can include a planar reference surface and a tapered recess precisely defined relative to the planar reference surface. In particular, the recess can slope downwardly, typically in a linear manner, from the planar reference surface at a first end to a final depth, such as 300 or more microns, at an opposed second end. In order to measure a major dimension of agglomerates 32', the grease can be placed on the planar reference surface proximate the first end of the recess. A second plate can then be slid over the measurement plate while maintaining contact with the planar reference surface such that the grease is forced across the recess from the first end to the opposed second end. As a result, the agglomerates of the grease become lodged in that portion of the recess having a depth equal to the major dimension of the respective agglomerate. Based upon the resulting distribution of the agglomerates within the recess defined by the measurement plate after sliding the second plate thereover, the major dimensions of agglomerates 32' can be reliably determined.

The inventors have identified the source of the problems, and have solved the problems with a grease layer 28' having agglomerates 32'. As a result of the reduced size of agglomerates 32', agglomerates 32' are much less likely to become lodged within the port defined by the prewet die. The application of grease layers 28' can therefore continue uninterrupted for longer periods of time since fewer agglomerates will become lodged in the port of the prewet die than during the application of conventional grease layers having larger agglomerates. Moreover, since agglomerates 32' comprise an effective quantity of substantially smaller agglomerates, substantially less microbending is experienced and, correspondingly, significantly reduced delta attenuations per fiber. This reduction in microbending and the resulting reduction in delta attenuation is particularly apparent in those embodiments in which grease layers 28' are relatively thin. As such, in one aspect of the present invention, fiber optic cable 10 includes grease layers 28' having a thickness between about 10 nanometers and about 50 nanometers. For fiber optic cables 10 that include grease layers 28' this thin, the reduction in size of agglomerates 32' such that a majority of agglomerates 32' have a major dimension less than about 150 microns is even more important since the number of agglomerates that are larger than grease layers 28' is reduced relative to conventional fiber optic cables.

By way of example, FIG. 3 depicts identifying the source of the high delta attenuations, the change in optical attenuation per kilometer, as measured in decibels per kilometer (dB/km), for signals having a wavelength of 1550 nanometers that are propagating along each optical fiber of four ribbons (designated R8–R11) of a conventional ribbon cable, using the conventional grease composition with significantly large agglomerates 32. In this regard, each ribbon includes twelve optical fibers (designated F0–F11) and is separated from each adjacent ribbon by a grease layer having a thickness of about 100 microns and including a plurality of agglomerates, the majority of which have a major dimension above 100 microns to 300 microns or more. As depicted in FIG. 3, twelve of the optical fibers have a delta attenuation of no more than 0.009 dB/km, while eleven of the optical fibers have a delta attenuation of at least 0.020 dB/km, with one of the optical fibers (R9, F0) disadvantageously having a delta attenuation of 0.033 dB/km.

For comparison purposes, FIGS. 4a and 4b each depict solving the problem of high delta attenuations for signals having a wavelength of 1550 nanometers that are propagating along each optical fiber of four ribbons (designated R8–R11) of a ribbon cable of a respective embodiment employing the grease layers 28' according to the present invention. Like the conventional fiber optic cable upon which FIG. 3 is based, each ribbon of the fiber optic cables upon which FIGS. 4a and 4b are based includes twelve optical fibers (designated F0–F11) and is separated from each adjacent ribbon by a grease layer having a thickness of about 100 microns. Relative to the fiber optic cable upon which FIG. 3 is based, however, the agglomerates of the grease layers of the fiber optic cables upon which FIGS. 4a and 4b are based are significantly different. In this regard, the vast majority of the agglomerates of the grease layers of the fiber optic cable upon which FIG. 4a is based are less than about 100 microns, while the fiber optic cable upon which FIG. 4b is based includes agglomerates that are even smaller, i.e., less than about 25 microns.

As depicted in FIG. 4a, nineteen of the optical fibers have a delta attenuation of no more than 0.009 dB/km, while only three of the optical fibers have a delta attenuation of at least 0.020 dB/km. No optical fiber has a delta attenuation of greater than 0.020 dB/km. With reference to FIG. 4b, all of the optical fibers have a delta attenuation of 0.015 dB/km or less, with thirty six of the optical fibers having a delta attenuation of no more than 0.009 dB/km. As FIGS. 4a and 4b demonstrate, agglomerates 32' significantly decrease the delta attenuation of the signals propagating along optical fibers 22, thereby improving the performance of fiber optic cable 10 according to the present invention.

Fiber optic cable 10 also generally includes a flooding or filling compound 34 disposed within buffer tube 12 and surrounding the plurality of optical fibers 22. Like grease layers 28, filling compound 34 includes a base component and a filler. In one embodiment according to the present invention, filling compound 34 is formed of the same material as grease layers 28' such that the base component is an oil, such as a hydrocarbon-based or polyalphaolefin-based oil, and the filler is comprised of a plurality of particles of silica, clay or the like that form agglomerates 32'. Additionally, filling compound 34 can include a polymer or rubber component, such as a Krayton™ thermoplastic elastomer that is commercially available from Shell Oil Company, for further thickening filling compound 34. Filling compound 34 can further include a bridging agent, such as polyglycol, for increasing the yield strength of filling compound 34 without increasing the viscosity of filling compound. Alternatively, compound 34 and layer 28' are formed of different materials. In addition, compound 34 can be removed and replaced by a water swellable substance.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims.

That which is claimed:

1. A fiber optic cable comprising:
   a buffer tube defining a lengthwise extending passageway;
   a plurality of ribbons of optical fibers extending through the passageway defined by said buffer tube; and
   a grease layer disposed between at least one pair of adjacent ribbons of optical fibers, said grease layer comprising a base component and a plurality of agglomerates comprised of particles, about 80%±20% of the agglomerates having a major dimension less than the thickness of the grease layer between adjacent optical ribbons, wherein said plurality of agglomerates have an average major dimension that is between about 75 microns and about 125 microns.

2. A fiber optic cable according to claim 1 wherein about 90%±10% of said agglomerates have a major cross-sectional dimension of less than about 100 microns.

3. A fiber optic cable according to claim 1, about 50±10% of said agglomerates having major cross sectional dimension less than about 75 microns.

4. A fiber optic cable according to claim 1 further comprising a plurality of grease layers disposed between respective pairs of adjacent ribbons of optical fibers, each grease layer comprising a plurality of agglomerates having an average major dimension that is less than about 150 microns.

5. A fiber optic cable according to claim 1 further comprising a filling compound that at least partially fills the passageway defined by said buffer tube, said filling compound comprising a base component and a plurality of agglomerates comprised of silica particles, wherein said agglomerates of said filling compound have major dimensions that are at least as large on average as the major dimensions of said agglomerates of said grease layer.

6. A fiber optic cable according to claim 5 wherein said agglomerates of said filling compound have the same major dimension on average as said agglomerates of said grease layer.

7. A fiber optic cable according to claim 6 wherein said agglomerates of said filling compound have a larger major dimension on average than said agglomerates of said grease layer.

8. A fiber optic cable comprising:
   a buffer tube defining a lengthwise extending passageway;
   a plurality of ribbons of optical fibers extending through the passageway defined by said buffer tube; and
   a grease layer disposed between at least one pair of adjacent ribbons of optical fibers, said grease layer having a thickness, about 80%±20% of said agglomerates have a major cross-sectional dimension of less than about 100 microns, wherein said plurality of agglomerates have an average major dimension that is between about 75 microns and about 125 microns.

9. A fiber optic cable according to claim 8 further comprising a plurality of grease layers disposed between respective pairs of adjacent ribbons of optical fibers, each grease layer comprising a plurality of agglomerates, about 50±10% of said agglomerates having a major cross sectional dimension less than about 75 microns.

10. A fiber optic cable according to claim 8 wherein the majority of said plurality of agglomerates have a major dimension less than about 100 microns.

11. A fiber optic cable according to claim 8 wherein each agglomerate is comprised of a plurality of particles of a material selected from the group consisting of silica and clay.

12. A fiber optic cable comprising:
    a buffer tube defining a lengthwise extending passageway;
    a plurality of optical fibers extending through the passageway defined by said buffer tube; and
    a filling compound disposed within said buffer tube and surrounding said plurality of optical fibers, said filling compound comprising a base component and a plurality of agglomerates comprised of silica particles, a majority of said plurality of agglomerates having an average major dimension that is between about 75 microns and about 125 microns.

13. A fiber optic cable according to claim 12 about 50±10% of said agglomerates having major dimension less than about 75 microns.

14. A fiber optic cable according to claim 12 wherein said plurality of agglomerates have an average major dimension of less than about 100 microns.

15. A fiber optic cable according to claim 12 further comprising a plurality of grease layers disposed between respective pairs of adjacent ribbons of optical fibers, each grease layer comprising the base component and a plurality of agglomerates with 90%±10% of the agglomerates having a major dimension that is less than about 100 microns.

16. A fiber optic cable according to claim 15 wherein said filling compound and said plurality of grease layers are comprised of the same compound.

* * * * *